United States Patent [19]

Mashimo

[11] Patent Number: 4,813,034
[45] Date of Patent: Mar. 14, 1989

[54] OPTICAL DISC RECORDING APPARATUS WITH A LIGHT BEAM HAVING A CONTROLLABLE QUANTITY

[75] Inventor: Akira Mashimo, Tokorozawa, Japan

[73] Assignee: Teac Corporation, Japan

[21] Appl. No.: 35,760

[22] Filed: Apr. 8, 1987

[30] Foreign Application Priority Data

Apr. 14, 1986 [JP] Japan .................... 61-84348

[51] Int. Cl.$^4$ .......................... G11B 7/00; H01S 3/13
[52] U.S. Cl. ....................... 369/116; 369/54; 369/55; 369/106; 372/29
[58] Field of Search .............. 369/44, 53–55, 369/58, 100, 101, 106, 116, 124; 372/28, 29, 31

[56] References Cited

U.S. PATENT DOCUMENTS

| | | | |
|---|---|---|---|
| 4,028,732 | 6/1977 | Salter et al. | 369/116 X |
| 4,093,961 | 6/1978 | Kanamaru | 369/116 X |
| 4,114,180 | 9/1978 | Kayanuma | 369/116 X |
| 4,157,568 | 6/1979 | Ohki et al. | 369/116 X |
| 4,162,398 | 7/1979 | Kayanuma | 369/116 X |
| 4,283,785 | 8/1981 | Miyauchi et al. | 369/116 |
| 4,328,506 | 5/1982 | Yoshida et al. | 369/116 X |
| 4,334,301 | 6/1982 | Kanamaru | 369/116 |
| 4,380,015 | 4/1983 | Ito et al. | 369/116 X |
| 4,419,750 | 12/1983 | Howe | 369/116 X |
| 4,516,242 | 5/1985 | Yokota | 369/116 X |

FOREIGN PATENT DOCUMENTS 50-92702 7/1975 Japan .

Primary Examiner—Raymond F. Cardillo
Assistant Examiner—W. R. Young
Attorney, Agent, or Firm—Ladas & Parry

[57] ABSTRACT

An optical disc recording apparatus comprises a light generating source for generating a recording light beam, an open loop circuit for controlling an amplitude of an angular modulated information signal responsive to a power setting signal indicative of a radial position of the recording light beam on the optical disc, a detector circuit for detecting a quantity of light of the recording light beam and for producing a D.C. signal within an output detection signal which is obtained by subjecting the detected quantity of light to a photoelectric conversion, a control circuit for variably controlling a level of the D.C. signal from the detecting circuit depending on the radial position of the recording light beam on the optical disc and according to a preset characteristic, and an adder for adding an output D.C. signal level of the control circuit and an output signal of the open loop circuit and for supplying an added signal to the light generating source so as to control a quantity of light of the recording light beam generated thereby. The D.C. signal from the detecting circuit is controlled by a closed loop circuit comprising the detecting circuit, the control circuit and the adder.

5 Claims, 1 Drawing Sheet

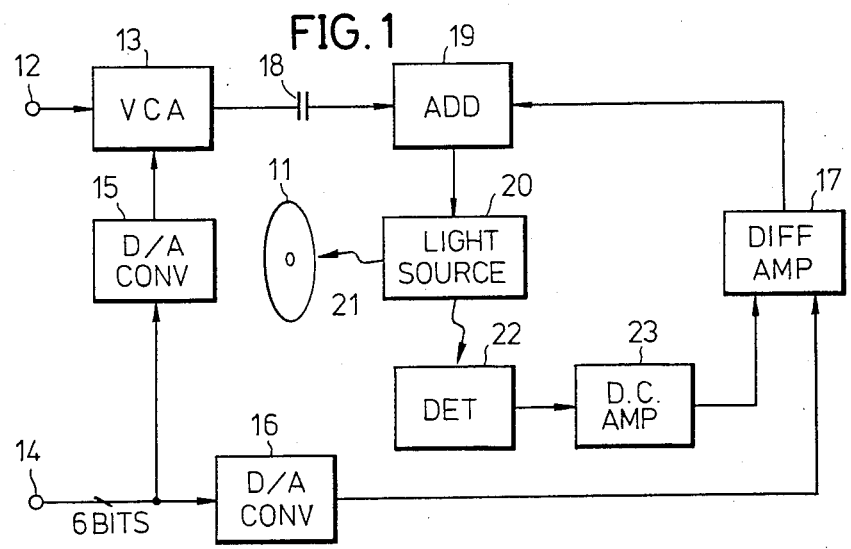
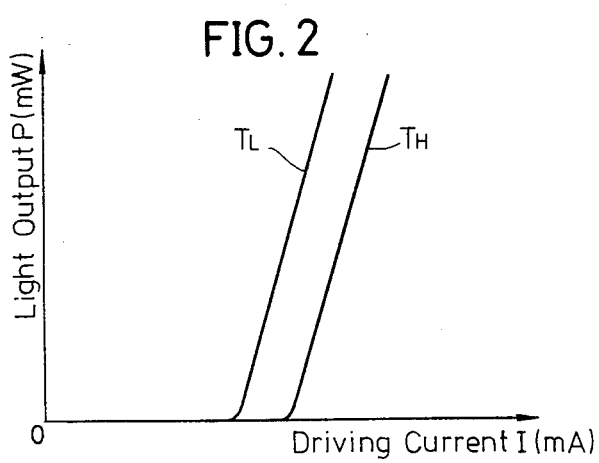
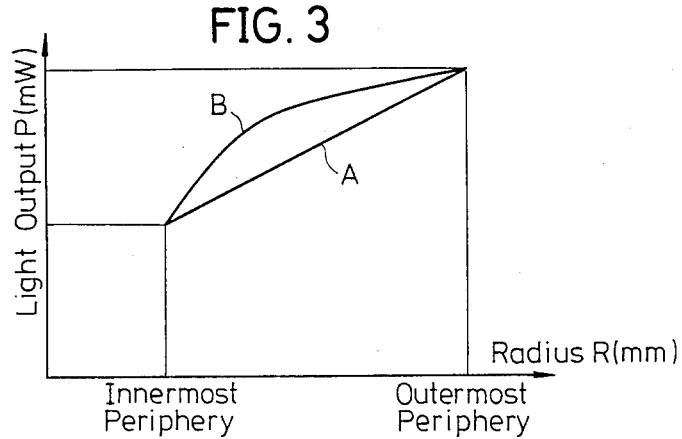

OPTICAL DISC RECORDING APPARATUS WITH A LIGHT BEAM HAVING A CONTROLLABLE QUANTITY

BACKGROUND OF THE INVENTION

The present invention generally relates to optical disc recording apparatuses, and more particularly to an optical disc recording apparatus which carries out a recording by variably controlling a quantity of light of a recording light beam depending on a radial position of the recording light beam on an optical disc.

Conventionally, in an optical disc recording apparatus which records an information signal on an optical disc which rotates at a constant rotation frequency by use of a recording light beam, it is known that the information signal cannot be recorded with a satisfactory signal-to-noise (S/N) ratio unless the light quantity is increased as a radial position of the recording light beam on the disc approaches an outer periphery thereof because a relative linear velocity between the disc and the recording light beam increases as the radial position of the recording light beam on the disc approaches the outer periphery from an inner periphery. For example, a Japanese Laid-Open Patent Application No. 50-92702 discusses this problem although an electron beam is used rather than a light beam.

However, in the case where a semiconductor laser (laser diode) is used as a light generating source for the recording light beam, problems occur since the semiconductor laser is easily affected by the ambient temperature. For example, even when a driving current is kept constant, an output of the semiconductor laser obtained with the ambient temperature of 50° C. is approximately ½ an output of the semiconductor laser obtained with the ambient temperature of 0° C. Further, an output characteristic of the light generating source also changes with age. Accordingly, there is a problem in that it is impossible to record the information signal with a satisfactory S/N ratio by simply controlling the quantity of light of the recording light beam depending on the radial position of the recording light beam on the disc.

SUMMARY OF THE INVENTION

Accordingly, it is a general object of the present invention to provide a novel and useful optical disc recording apparatus in which the problems described heretofore are eliminated.

Another and more specific object of the present invention is to provide an optical disc recording apparatus comprising detecting means for detecting a quantity of light of a recording light beam and closed loop means for controlling the quantity of light of the recording light beam based on a detection output of the detecting means. According to the optical disc recording apparatus of the present invention, it is possible to satisfactorily record an information signal on an optical disc for the entire recording region thereof.

Other objects and further features of the present invention will be apparent from the following detailed description when read in conjunction with the accompanying drawings.

BRIEF DESCRIPTION OF THE DRAWINGS

FIG. 1 is a system block diagram showing an embodiment of the optical disc recording apparatus according to the present invention;

FIG. 2 is a graph showing an output characteristic of a light generating source; and FIG. 3 is a graph showing embodiments of linear and non-linear preset characteristics.

DETAILED DESCRIPTION

In FIG. 1, an optical disc 11 is rotated at a constant rotation frequency, for example, by a known means (not shown). An information signal such as a video signal which is to be recorded on the disc 11 is applied to an input terminal 12 in the form of an angular modulated signal such as a frequency modulated (FM) signal and is supplied to a voltage controlled amplifier (VCA) 13.

On the other hand, a power setting signal which indicates a radial position of a recording light beam 21 on the disc 11 is applied to an input terminal 14. For example, this power setting signal is a 6-bit digital signal generated by a known means. The six bits of the power setting signal are supplied in parallel to a digital-to-analog (D/A) converters 15 and 16. For example, the power setting signal may be generated based on a pre-recorded address signal which is reproduced from the disc 11, or may be generated by a mechanical means which mechanically detects the radial position of the recording light beam 21 on the disc 11.

Two D.C. signals having levels which change depending on the radial position of the recording light beam 21 on the disc 11 are independently obtained from the respective D/A converters 15 and 16. The output D.C. signal of the D/A converter 15 is supplied to the VCA 13, and the output D.C. signal of the D/A converter 16 is supplied to a differential amplifier 17. The two D/A converters 15 and 16 are provided with respect to one power setting signal because the voltage settings of the VCA 13 and the differential amplifier 17 are different from each other.

As a result, the amplitude of an input angular modulated information signal is variably controlled depending on the radial position of the recording light beam 21 on the disc 11 and depending on a preset characteristic which determines the quantity of light of the recording light beam 21, and is obtained from the VCA 13. The output angular modulated information signal of the VCA 13 is passed through a D.C. blocking capacitor 18 and is supplied to an adding circuit 19. For example, a semiconductor laser is used as the light generating source 20.

The light generating source 20 is driven by an output driving current of the adding circuit 19 and irradiates on the disc 11 the recording light beam (laser beam) 21 having a light intensity (quantity of light) dependent on the value of the driving current so as to record the information signal on the disc 11. The quantity of light of the recording light beam 21 in terms of A.C. is controlled depending on the amplitude of the output angular modulated information signal of the VCA 13, that is, the output D.C. signal level of the D/A converter 15, so that the quantity of light gradually increases as the recording light beam 21 on the disc 11 moves toward the outer periphery of the disc 11.

On the other hand, the quantity of light of the recording light beam 21 is detected by a detecting means 22. For example, the detecting means 22 comprises a known monitoring diode (or light detecting element) which converts the detected light beam into an electrical signal by a photoelectric conversion. The output signal of the detecting means 22 is supplied to a D.C. amplifier 23 which at least has a lowpass filter characteristic for eliminating a recording signal frequency component, and only a D.C. component and an extremely low frequency component is amplified and supplied to the differential amplifier 17.

The differential amplifier 17 produces a signal having a level dependent on a level difference between the output signals of the D/A converter 16 and the D.C. amplifier 23, and an output signal of the differential amplifier 17 is supplied to the light generating source 20 via the adding circuit 19. As a result, the D.C. component of the quantity of light of the recording light beam 21 is also controlled to a preset value in accordance with a radial position of the recording light beam 21 on the disc 11. The control of the D.C. component of the quantity of light of the recording light beam 21 is carried out by a closed loop comprising the detecting means 22, the D.C. amplifier 23, the differential amplifier 17, the adding circuit 19 and the light generating source 20. For this reason, the quantity of light of the recording light beam 21 generated from the light generating source 20 can be accurately controlled without being affected by a temperature change, aging and the like.

The output characteristic of the light generating source 20 changes with temperature, as shown in FIG. 2, for example. In FIG. 2, the ordinate indicates the light output P (mW), the abscissa indicates the driving current I (mA), and $T_L$ and $T_H$ respectively indicate the output characteristics at low and high temperatures. However, according to the present invention, it is possible to constantly control the quantity of light of the recording light beam 21 to an optimum value regardless of the temperature change (and age) due to the provision of the closed loop including the detecting means 22 which detects the quantity of light of the recording light beam 21.

The power setting signal applied to the input terminal 14 is a digital signal which determines the relationship between the position of the recording light beam 21 on the disc 11 and the quantity of light of the recording light beam 21. The preset characteristic which determines the quantity of light of the recording light beam 21 is not limited to a linear characteristic such as that indicated by A in FIG. 3 which increases the quantity of light linearly (monotone increase) as the radial position of the recording light beam 21 on the disc 11 moves toward the outer periphery, and may be a non-linear characteristic such as that indicated by B in FIG. 3 which increases the quantity of light non-linearly as the radial position of the recording light beam 21 on the disc 11 moves toward the outer periphery. In other words, the preset characteristic simply needs to be selected to such a characteristic that the information signal can constantly be recorded with an optimum quantity of light. In FIG. 3, the ordinate indicates the light output P (mW), and the abscissa indicates the radius R (mm) on the disc 11.

It is also possible to use the power setting signal from the input terminal 14 to variably control the quantity of light of the recording light beam 21 finely in the inner peripheral portion of the disc 11 and to variably control the quantity of light of the recording light beam 21 roughly in the outer peripheral portion of the disc 11.

In addition, the present invention is not only applicable to the recording of the constant angular velocity (CAV) system discs, but also to the recording of the constant linear velocity (CLV) system discs.

According to the present invention, the recording of the information signal on the optical disc is carried out by varying not only the A.C. quantity of light but also the D.C. bias quantity of light depending on the radial position of the recording light beam on the disc. Hence, even when the output characteristic of the light generating source for generating the recording light beam changes with temperature and/or age, it is possible to vary the quantity of light of the recording light beam without being affected by the ambient temperature and/or age. As a result, according to the optical disc recording apparatus of the present invention, it is possible to satisfactorily record the information signal on the optical disc for the entire recording region thereof.

Further, the present invention is not limited to these embodiments, but various variations and modifications may be made without departing from the scope of the present invention.

What is claimed is:

1. An optical disc recording apparatus for recording an information signal on an optical disc by use of a recording light beam, said optical disc recording apparatus comprising:

a light generating source for generating a recording light beam;

a first input terminal supplied with an angular modulated information signal;

a second input terminal supplied with a power setting signal indicative of a radial position of the recording light beam on the optical disc;

open loop circuit means for controlling an amplitude of the angular modulated information signal responsive to the power setting signal;

detecting means for detecting a quantity of light of the recording light beam and for producing a direct current signal within an output detection signal which is obtained by subjecting the detected quantity of light to a photoelectric conversion, said detecting means comprising a light detecting element for detecting the quantity of light of the recording light beam and for producing the detection signal, and direct current amplifier for passing only a direct current component and a low frequency component of the detection signal from said light detecting element;

level control means for variably controlling a level of the direct current signal from said detecting means depending on the radial position of the recording light beam on the optical disc and according to a preset characteristic, said level control means comprising a differential amplifier for supplying to said adding means a signal having a level dependent on a level difference between the direct current signal from said second input terminal; and adding means for adding an output direct current signal level of aid level control means and an output signal of said open loop circuit means and for supplying an added signal to said light generating source so as to control a quantity of light of the recording light beam generated thereby, said direct current signal from said detecting means being controlled by a closed loop circuit means comprising said detecting means, said level control means and said adding means.

2. An optical disc recording apparatus as claimed in claim 1 in which said light generating source comprises a semiconductor laser for generating a laser beam as the recording light beam.

3. An optical disc recording apparatus as claimed in claim 1 in which said open loop circuit means comprises a voltage controlled amplifier for amplifying the angular modulated information signal from said first input terminal with an amplification controlled responsive to the power setting signal from said second input terminal.

4. An optical disc recording apparatus as claimed in claim 1 in which said light detecting element comprises a monitoring diode.

5. An optical disc recording apparatus as claimed in claim 1 in which said preset characteristic increases the quantity of light of the recording light beam as the radial position of the recording light beam on the optical disc moves toward the outer periphery of the optical disc.

* * * * *